United States Patent
Semba et al.

(10) Patent No.: US 7,728,473 B2
(45) Date of Patent: Jun. 1, 2010

(54) ELECTRIC ROTATING MACHINE AND MANUFACTURING METHOD OF THE SAME

(75) Inventors: Akitomi Semba, Hitachi (JP); Fumihiko Goto, Mito (JP); Juichi Enyama, Hitachi (JP)

(73) Assignees: Hitachi, Ltd., Tokyo (JP); Hitachi Engineering & Services Co., Ltd., Hitachi-shi (JP)

( * ) Notice: Subject to any disclaimer, the term of this patent is extended or adjusted under 35 U.S.C. 154(b) by 0 days.

(21) Appl. No.: 12/416,490

(22) Filed: Apr. 1, 2009

(65) Prior Publication Data
US 2009/0205194 A1    Aug. 20, 2009

Related U.S. Application Data

(62) Division of application No. 11/543,876, filed on Oct. 6, 2006, now Pat. No. 7,521,829.

(30) Foreign Application Priority Data
Oct. 7, 2005    (JP)    ............................. 2005-294291

(51) Int. Cl.
*H02K 11/00* (2006.01)
(52) U.S. Cl. ............................. 310/71; 310/270; 29/598
(58) Field of Classification Search ........... 29/596–598; 310/71, 52, 61, 270
See application file for complete search history.

(56) References Cited

U.S. PATENT DOCUMENTS

| | | | |
|---|---|---|---|
| 3,939,368 A * | 2/1976 | Albaric et al. ................. | 310/59 |
| 4,712,029 A | 12/1987 | Nold | |
| 4,773,154 A * | 9/1988 | Gellert ......................... | 29/611 |
| 4,870,308 A | 9/1989 | Sismour, Jr. | |
| 4,941,249 A * | 7/1990 | Gellert ......................... | 29/611 |
| 5,063,320 A * | 11/1991 | Watanabe et al. ........... | 310/270 |
| 5,122,696 A * | 6/1992 | Shih et al. ..................... | 310/71 |
| 5,174,011 A * | 12/1992 | Weigelt ........................ | 29/598 |
| 5,358,432 A | 10/1994 | Shih et al. | |
| 6,280,265 B1 | 8/2001 | Hopeck et al. | |
| 6,347,968 B1 * | 2/2002 | Hamilton et al. ............ | 439/843 |
| 6,528,917 B2 | 3/2003 | Shimamoto et al. | |
| 6,681,477 B2 | 1/2004 | Shimamoto et al. | |
| 6,798,101 B1 * | 9/2004 | Tekawade ..................... | 310/71 |
| 6,989,621 B2 * | 1/2006 | Kaminski et al. ........ | 310/261.1 |
| 7,002,270 B2 | 2/2006 | Zhang et al. | |
| 7,119,462 B2 | 10/2006 | Zhang et al. | |
| 7,129,605 B2 | 10/2006 | Zhang et al. | |
| 2007/0257577 A1 * | 11/2007 | Bizjak ......................... | 310/232 |

* cited by examiner

*Primary Examiner*—Thanh Lam
(74) *Attorney, Agent, or Firm*—Brundidge & Stanger, P.C.

(57) ABSTRACT

A electric rotating machine includes a rotor winding constituting a part of a rotor, a conductor provided in a center portion in a radial direction of a rotor body for supplying electricity to the rotor winding from the outside, a leader drawn from the conductor to an outside diameter side, and a connecting line constructed by stacking a plurality of conductor plates to electrically connect the rotor winding and the leader. The connecting line consists of a radial direction linear portion which is straight in the radial direction on the leader side, and a bending portion which branches into two routes toward opposite directions to each other in a rotor shaft direction from the radial direction linear portion and has a linear portion formed at a part of the bending portion. The linear portion of the bending portion is joined to a bottom surface of the rotor winding.

2 Claims, 5 Drawing Sheets

ELECTRIC ROTATING MACHINE AND MANUFACTURING METHOD OF THE SAME

This application is a divisional application of U.S. application Ser. No. 11/543,876, filed Oct. 6, 2006, now U.S. Pat. No. 7,521,829 now allowed.

BACKGROUND OF THE INVENTION

1. Field of the Invention

The present invention relates to an electric rotating machine and a manufacturing method thereof, and relates to an electric rotating machine such as a turbine generator and the like for example, which is preferable for those provide with a connecting line which connects a conductor for supplying electricity from the outside and an end portion of a rotor winding, and a manufacturing method thereof.

2. Description of Related Art

A generator used in power generating equipment including a gas turbine or a steam turbine as a driving source generates electric power by mutual electromagnetic induction between a rotor and a stator. In general, a rotor winding is formed by a plurality of conductors wound thereon for producing an induction field, and a magnetic flux is generated by electrifying the winding. Accordingly, the rotor winding requires a conductor for supplying electricity from the outside of the generator, and this conductor is generally provided in a center portion of a rotor body, and the conductor and an end portion of the rotor winding are connected by a connecting line. The connecting line is generally designed to have a bending portion for the purpose of relieving deformation caused by the difference in thermal extension due to the difference in material between the conductor and the rotor body, and by a centrifugal force (see U.S. Pat. No. 5,122,696, for example).

For the meantime, by technological advance in recent years, the size of an electric rotating machine having the same output becomes more compact than before, the output per unit volume increases, and correspondingly, the rise in temperature of a current-carrying part tends to be large. Therefore, it is the mainstream to apply an iron material to the rotor and apply a copper material to the rotor winding, however, the thermal extension difference caused by current applied during operation occurs due to the difference in physical properties between those.

Thus, in order to prevent each component member from breaking due to fatigue in strength, a mechanism for absorbing the thermal extension is required for applying it to an actual machine. Particularly, since a generator of which the drive source is a gas turbine or a steam turbine is operated generally at 1500 to 3600 rpm in a steady state, a rotor having a rotary shaft of which the length is larger than its diameter is adopted in view of a limitation of strength due to a centrifugal force. Further, a rotor wining of the generator is often equipped with a conductor wound in a number of layers in a rectangular shape and has its longitudinal direction in a rotor axial direction, and therefore, the thermal extension direction conspicuously appears in the axial direction.

Further, for preventing the rotor winding from protruding in a radial direction by its rotation, it is general to provide a rotor body part with a wedge, and provide a rotor end portion with a retaining ring. However, since the retaining ring bellies out in the radial direction during rotation due to a hoop force, the end portion of the rotor winding located directly under there also bellies out toward an outside diameter side in the same manner.

On the other hand, a conductor is provided in an axial center portion of the rotor and is connected with the external power supply for electrifying the rotor winding, and a conductor support pillar attached to this conductor and the end portion of the rotor winding are electrically connected by a connecting line (lead). This connecting line is repeatedly affected by the above described thermal extension in the axial direction and by the displacement in the outside diameter direction by a centrifugal force, at each actuation and stoppage.

As the structure which absorbs an operating force by this displacement, U.S. Pat. No. 5,122,696 proposes a connecting line which provides a space by connecting two conductors having the structure of a T shape having a bent portion. Since a coil surface on which the connecting line is mounted differs in radial direction position from another coil surface, the structure of a main body of the connecting line forms the T shape in order to absorb the displacement in the outside diameter direction by a centrifugal force. The conductor at the bent portion space of the T-shaped structure is constructed by a thin single conductor, and has a second T-shaped conductor inside the above described T-shaped conductor in combination, for the purpose of reinforcement.

BRIEF SUMMARY OF THE INVENTION

As described above, because the connecting line disclosed in U.S. Pat. No. 5,122,696 is has the shape which requires complicated assemble processing by using a single conductor which is not formed by stacking conductors, the connecting line is unfavorable in operability, and the space occupation rate of a lateral bar portion of one of the above described T shapes is large, so that an insulating distance between adjacent coils which differ in electric potential becomes small, for example. Further, since the connecting line has a vertical bar of the above described T shape connected to the coil and the other one of the above described T-shaped conductors in combination, the connecting line itself becomes heavy, which makes the cause of the displacement in the axial direction and the radial direction. In addition, if the coil surface on which the connecting line is placed is close to the rotor surface and therefor a space is small, it is difficult to install this complicated structure.

A first object of the present invention is to provide an electric rotating machine having a connecting line which is easily mounted with simple structure and favorable in operability, secures an insulating distance from an adjacent coil, absorbs thermal extension in an axial direction repeatedly occurring at each actuation and stoppage and an operating force caused by displacement in a radial direction due to a centrifugal force, and does not lead to a fatigue fracture.

Further, a second object of the present invention is to provide a manufacturing method of an electric rotating machine which suppresses temperature rise of a bending portion of a connecting line to prevent reduction in strength of a copper material of the connecting line, when connecting the connecting line in the electric rotating machine.

In order to attain the above described first object, an electric rotating machine of the present invention includes a rotor winding constituting a part of a rotor, a conductor provided in a rotor body for supplying electricity to the rotor winding from the outside, a leader drawn from the conductor, and a connecting line constructed by stacking a plurality of conductor plates to electrically connect the rotor winding and the leader, characterized in that the connecting line comprises a radial direction linear portion which is straight in a radial direction on the leader side, and a bending portion which branches off into two routes toward opposite directions to each other in a rotor shaft direction from the radial direction linear portion and has a linear portion formed at a part of the bending portion, and the linear portion of the bending portion and a bottom surface of the rotor winding are joined to each other.

In addition, in order to attain the second object, a method of manufacturing an electric rotating machine of the present invention is characterized in that when connecting a rotor winding constituting a part of a rotor and a leader line drawn to an outer diameter side from a conductor provided in a center portion in a radial direction of a rotor body for supplying electricity to the rotor winding from the outside, via a connecting line which is constructed by stacking a plurality of conductor plates and comprises a radial direction linear portion which is straight in the radial direction on the leader line side and a bending portion branching off into two routes toward opposite directions to each other in a rotor shaft direction from the radial direction linear portion and having a linear portion formed in a part of the bending portion, by electrically joining the linear portion of the bending portion and a bottom surface of the rotor winding, a cooling structure is inserted in a hollow part formed in the bending portion of the connecting line, a brazing material is subsequently sandwiched between the bottom surface of the rotor winding and the connecting line of the bending portion, a brazing material flow inhibitor is applied on the bending portion of the connecting line, and the brazing material is subsequently heated and melted while flowing a cooling medium in the cooling structure to join an outermost layer of the conductor plates and the bottom surface of the rotor winding.

According to the present invention, since the connecting line having the bending portion, and the bottom surface of the rotor winding only have to be joined to each other, it is unnecessary to use an extra component or perform an extra attachment operation like the prior art, and it is possible to receive a centrifugal force by the bottom surface of the rotor winding. Further, since deformation in the axial direction and the radial direction can be absorbed by the bending portion of the connecting line, it becomes possible to absorb thermal extension in the axial direction repeatedly occurring at each actuation and stoppage of the electric rotating machine, and an operating force caused by displacement in the radial direction due to a centrifugal force. As a result, the deformation amount of the connecting line is suppressed, and a fatigue fracture is prevented.

In addition, according to the manufacturing method of the present invention, since it is possible to suppress temperature rise of the bending portion of the connecting line when connecting the connecting line in the electric rotating machine, reduction in strength of the copper material of the connecting line can be prevented.

Other objects, features and advantages of the invention will become apparent from the following description of the embodiments of the invention taken in conjunction with the accompanying drawings.

DETAILED DESCRIPTION OF THE INVENTION

A connecting line which absorbs thermal extension in an axial direction which repeatedly occurs at each actuation and stoppage, and an operating force caused by displacement in a radial direction due to a centrifugal force, and does not lead to a fatigue fracture is realized with simple structure which is easily mountable and has favorable operability.

EXAMPLE 1

Hereinafter, a connecting line in an electric rotating machine according to an embodiment of the present invention will be described with reference to the drawings.

Figure 8:
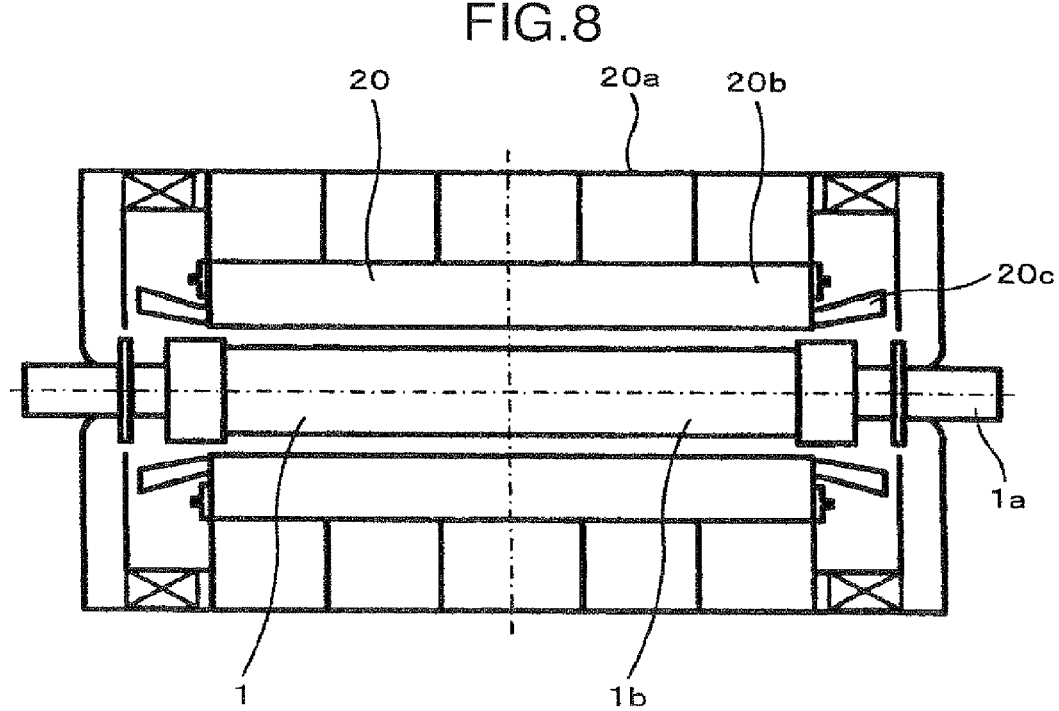
FIG. 8 is a view showing one example of the electric rotating machine.

FIG. 8 shows a turbine generator as one example of the electric rotating machine, and the turbine generator is generally constructed by a rotor 1 which is formed by winding a rotor winding (not shown) on a rotor body part 1b fixed to a rotary shaft 1a, and a rotor 20 which is formed by winding a stator winding 20c on a stator core 20b fixed to a stator frame 20a.

Figure 9:
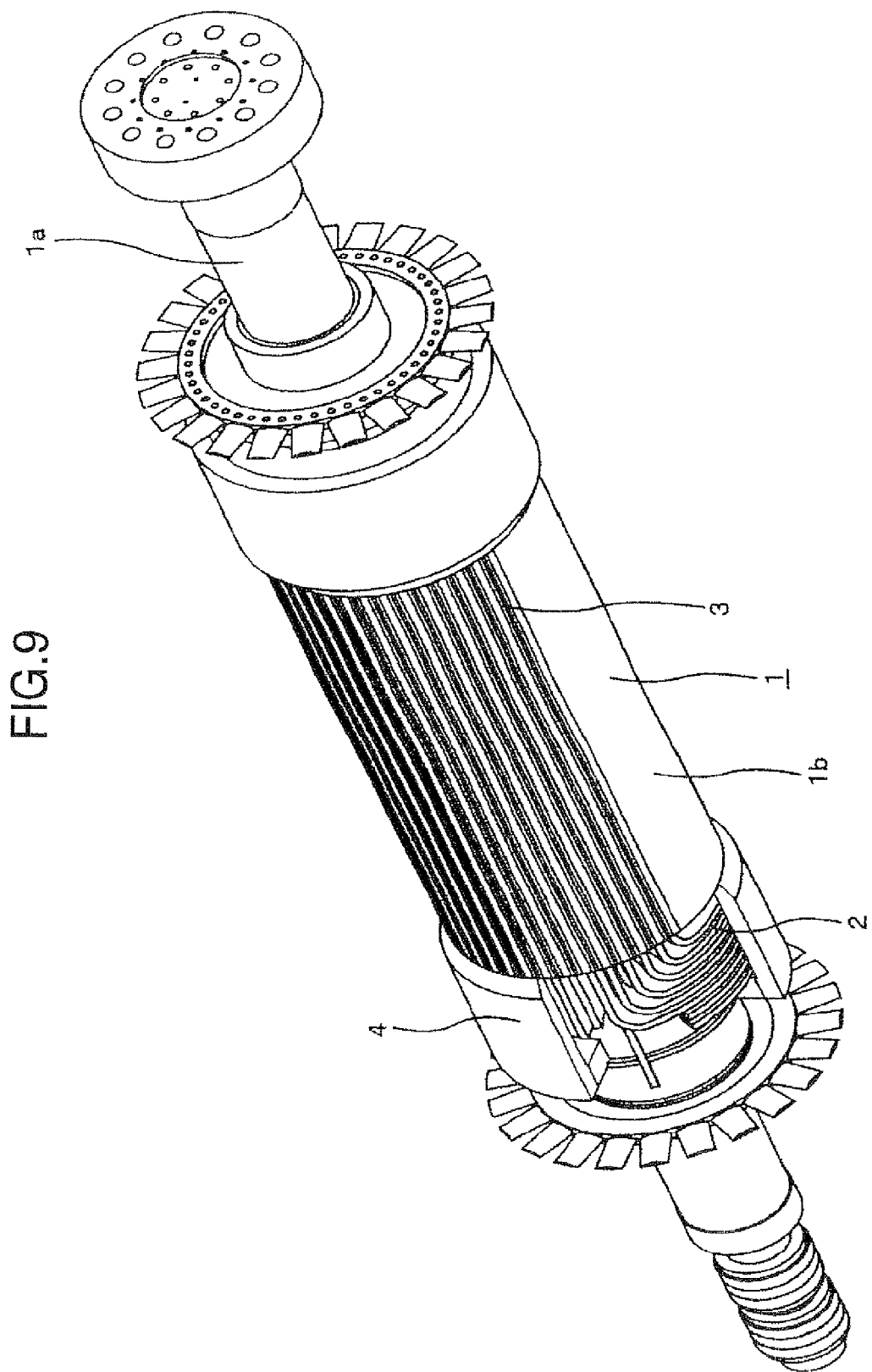
FIG. 9 is a perspective view showing one example of a rotor in FIG. 8.

FIG. 9 shows the rotor 1 of the turbine generator shown in FIG. 8. As shown in the drawing, the rotor 1 is constructed by the rotary shaft 1a and the rotor body part 1b which is fixed to the rotary shaft 1a and extends in an axial direction, and has a plurality of slots formed with a predetermined space in a circumferential direction from each other, a rotor winding 2 with a plurality of rotor conductors stacked and housed in the respective slots of the rotor body part 1b, a retaining ring (holding ring) 4 which covers and holds an end portion of the rotor winding 2 in the axial direction, and a wedge 3 provided on a surface for preventing the rotor winding 2 inside the slot of the rotor body part 1b from dropping out.

Figure 1:
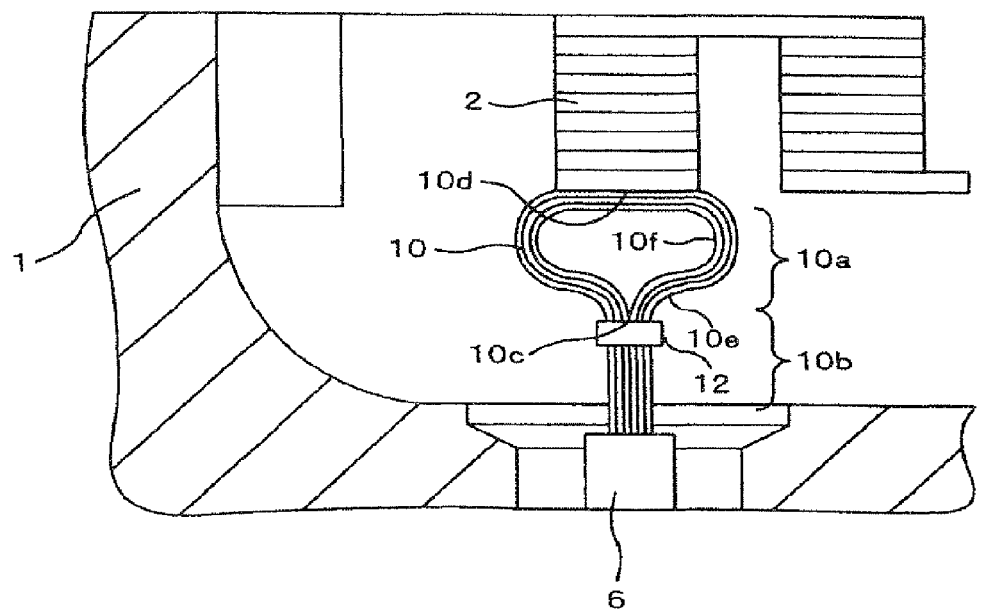
FIG. 1 shows one example of an electric rotating machine of the present invention, and is a partial sectional view of a rotor end portion.

Next, the connecting line in the electric rotating machine of the present invention described above will be described by using FIG. 1. As shown in FIG. 1, the connecting line (lead) 10 is used for electrically connecting a conductor support pillar (stud) 6 which is a leader for leading in a radial direction from a conductor in the axial center portion of the rotor 1, and an end portion of the rotor winding 2.

The connecting line 10 constructed by stacking a plurality of conductor plates is generally constructed by a radial direction linear portion 10b which extends in the radial direction from the conductor support pillar 6 which is the leader located in the center portion of the rotor 1, and a bending portion 10a which branches off into two routes from the radial direction linear portion 10b. The radial direction linear portion 10b is provided with a stopper 12 for tying the stacked conductor plates, on the boarder of the bending portion 10a.

Further, the connecting line 10 is joined to a bottom surface of the rotor winding at an outermost layer plane portion of an axial direction linear portion 10d of the bending portion 10a.

The bending portion 10a is formed by portions 10e parallel with the rotor shaft which branch off from a root portion 10c of the connecting line into two routes in the directions opposite from each other in the rotor shaft direction with the same number (three in the drawing) of conductor plates for each route, a curve portion 10f which extends from each of tip ends of the portions 10e parallel with the rotor shaft and is formed into a U-shape, and the axial direction linear portion 10d which extends inward the rotor shaft direction from each of tip ends of the curve portions 10f, and forms bilateral symmetry with respect to a center line of the radial direction linear portion 10b to construct one space.

By constructing it in this manner, a centrifugal force of the connecting line 10 itself, which is applied in the radial direction (and acts in the upper direction in the drawing) when the electric rotating machine rotates, becomes ultimately applied to the entire bottom surface of the rotor winding. In this example, since the connecting line branches off to be bilaterally symmetrical in the rotor shaft direction, the above described centrifugal force is dispersed equally to the two routes, and thus is absorbed and relieved by the bending portion 10a forming a curved surface.

Further, the thermal extension deformation in the axial direction (the lateral direction in the drawing) can be absorbed by the curve portions 10f of the bending portion 10a of the connecting line, and by the radial direction linear portion 10b having the cantilever structure.

Accordingly, by further adding the above described structure to the connecting line constructed by stacking a plurality of conductor plates, it is possible to absorb the thermal extension in the axial direction which repeatedly occurs at each actuation and stoppage, and the operating force caused by the displacement in the radial direction due to the centrifugal force, and becomes possible to suppress the deformation amount of the connecting line to prevent the fatigue fracture.

The stopper 12 can prevent the radial direction linear portion 10b of the connecting line from opening by the centrifugal force.

Other examples of the present invention will be shown in FIGS. 2 to 6.

Figure 2:
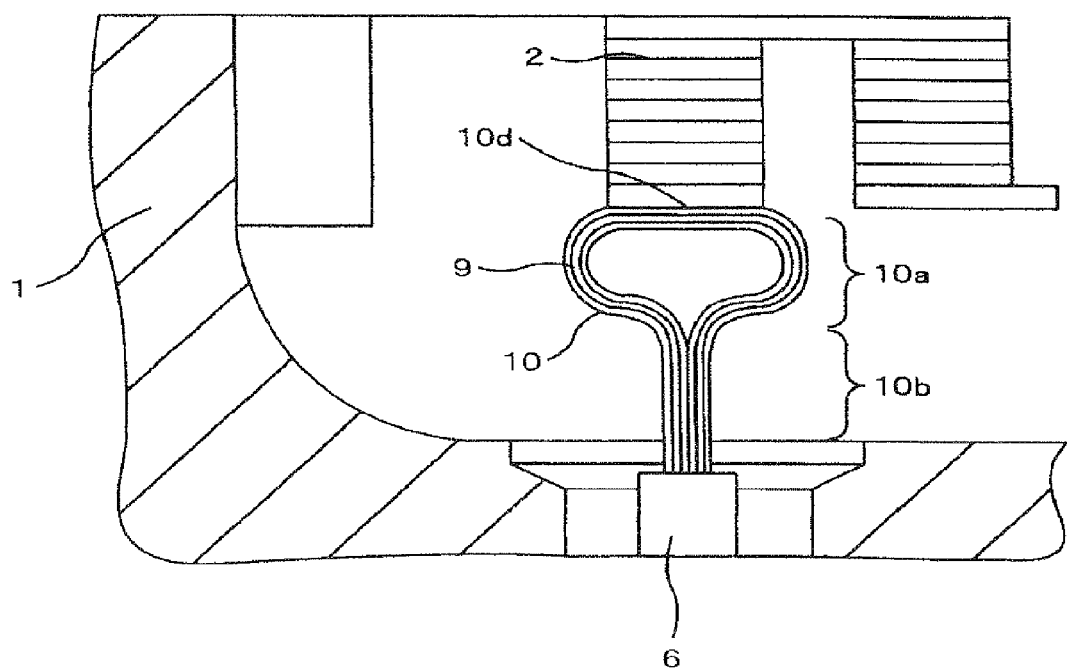
FIG. 2 shows another example of the electric rotating machine of the present invention, and is a partial sectional view of a rotor end portion.
Figure 3:
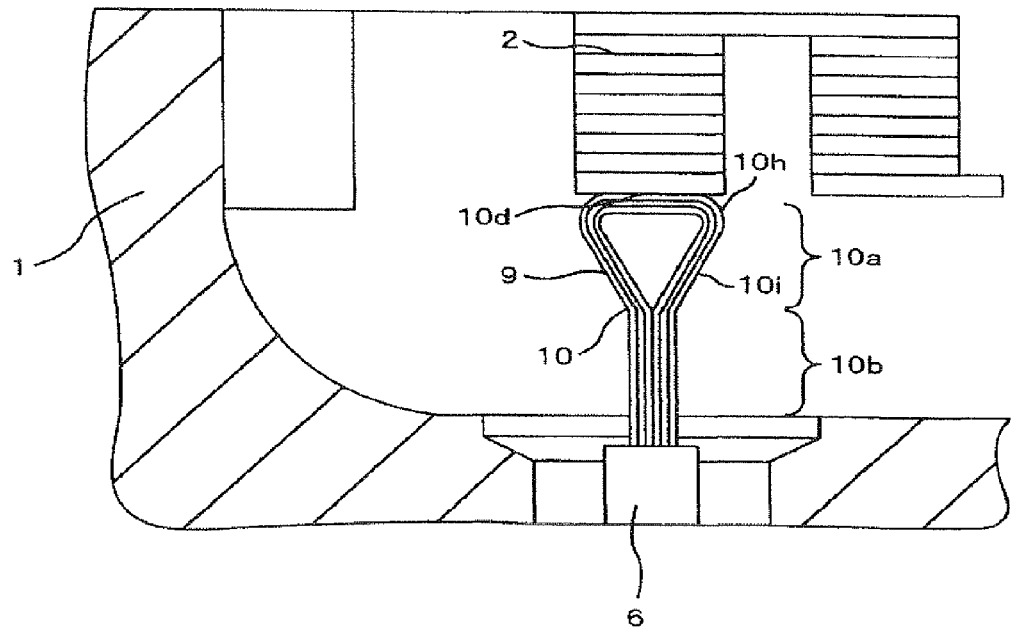
FIG. 3 shows another example of the electric rotating machine of the present invention, and is a partial sectional view of a rotor end portion.
Figure 4:
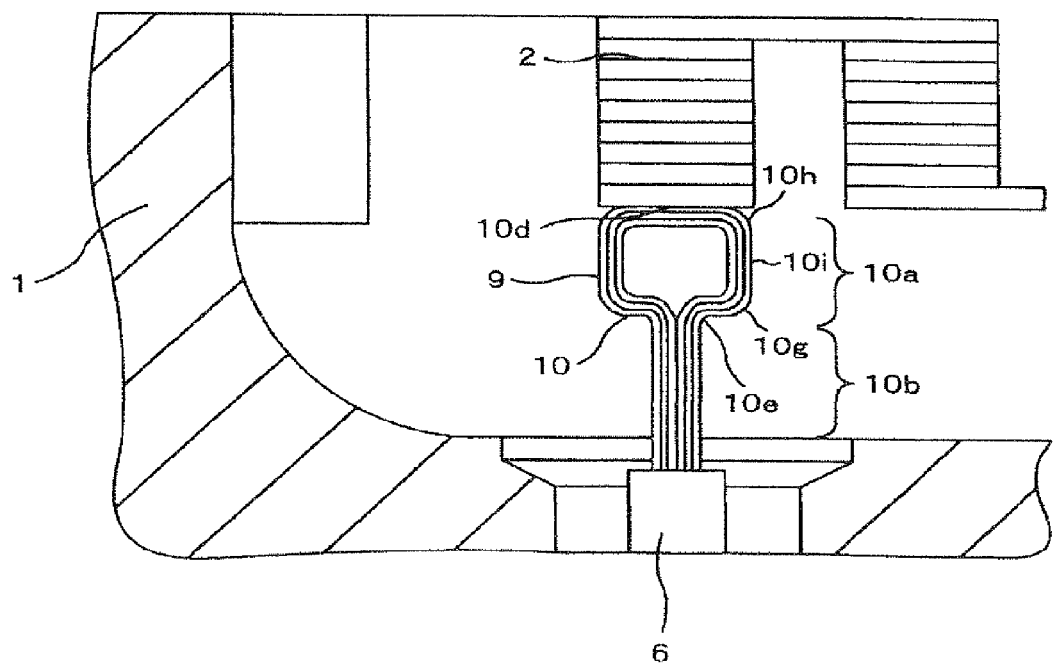
FIG. 4 shows another example of the electric rotating machine of the present invention, and is a partial sectional view of a rotor end portion.
Figure 5:
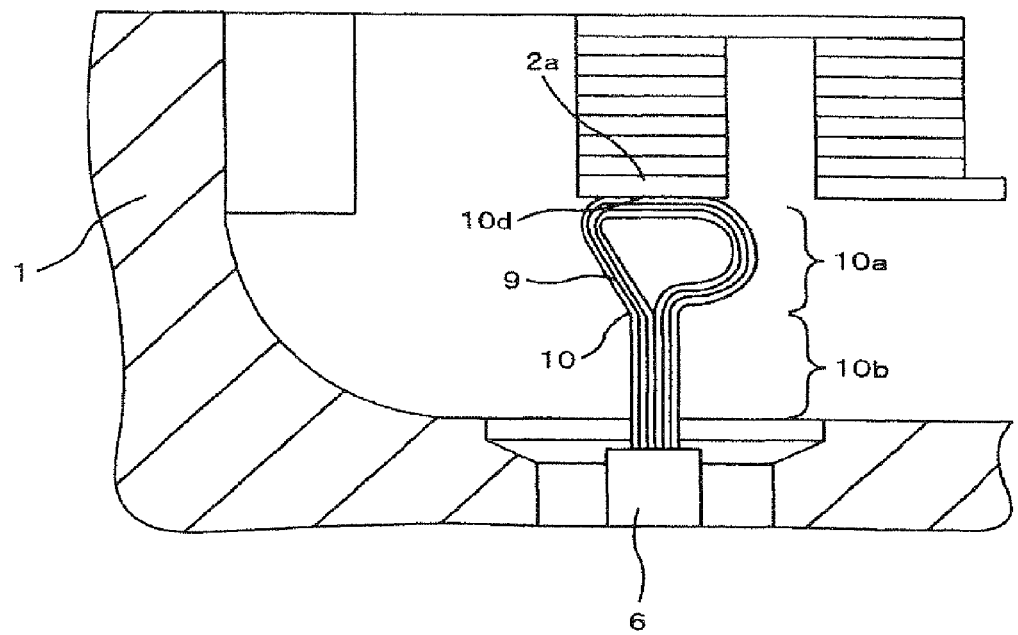
FIG. 5 shows another example of the electric rotating machine of the present invention, and is a partial sectional view of a rotor end portion.
Figure 6:
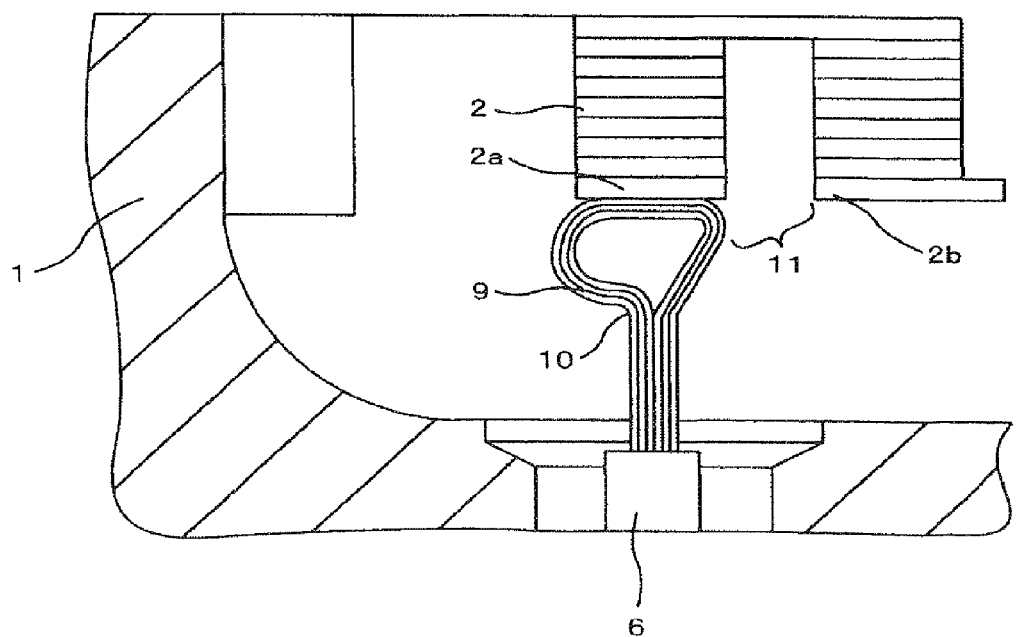
FIG. 6 shows another example of the electric rotating machine of the present invention, and is a partial sectional view of a rotor end portion.

FIGS. 2, 3 and 4 show the other examples of the present invention in which the connecting line 10 branches off into two laterally symmetrical routes in both directions of the rotor shaft, and FIGS. 5 and 6 show other examples of the present invention in which the connecting line 10 branches off into two laterally unsymmetrical routes in both the directions of the rotor shaft.

EXAMPLE 2

FIG. 2 shows an example in which the stopper 12 in the example shown in FIG. 1 is not provided, and all other components are the same as those in the example shown in FIG. 1.

In this example, although it is impossible to prevent the radial direction linear portion 10b of the connecting line from opening by the centrifugal force, it is possible not only to provide the effects of the above described example, but also to somewhat relieve the displacement in the outside diameter direction due to the centrifugal force acting on the connecting line 10 by the amount of the mass of the stopper 12 being eliminated.

EXAMPLE 3

FIG. 3 shows an example in which the shape is made into a substantially inverted triangle by possibly shortening the bending portion 10a of the connecting line in the example shown in FIG. 2.

The bending portion 10a is formed into a triangular shape by a linear portion 10i in which the conductor plates extend in a V shape state from the radial direction linear portion 10b to branch into two routes with the same number (three in the drawing) of the conductor plates for each route, and by an axial direction linear portion 10d in which each of tip ends of the linear portion 10i extends inward in the rotor shaft direction via arc portions 10h to define one space.

In this example, it is possible not only to achieve the same effect as the above described example, but also to reduce the centrifugal force itself due to the own weight by making the mass of the connecting line 10 as small as possible, and therefore, the displacement in the outside diameter direction can be relieved. This example is effective when the distance between the conductor support pillar 6 and the rotor winding 2 is short due to the structure of the electric rotating machine.

EXAMPLE 4

FIG. 4 shows an example in which the shape of the bending portion 10a of the connecting line in the example shown in FIG. 2 is made into a substantially quadrangle.

The bending portion 10a is formed into the quadrangle by a portion 10e parallel with the rotor shaft in which the conductor plates branch off from the radial direction linear portion 10b into two routes with the same number of the conductor plates (three in the drawing) for each route in the directions opposite to each other in the rotor shaft direction, a linear portion 10i which extends in the radial direction via an arc portion 10g from each of the tip ends of the portions 10e which is parallel with the rotor shaft, and is parallel with the radial direction linear portion 10b, and an axial direction linear portion 10d which extends inward in the rotor shaft direction via arc portions 10h from each of the tip ends of the linear portions 10i parallel with the radial direction linear portion 10b, and defines one space.

In this example, it is possible not only to achieve the same effect as the above described example, but also to absorb the deformation by the thermal extension in the axial direction of the rotor to a large extent since the shape of the connecting line has a soft structure flexible in the lateral direction by making the shape of the bending portion 10a of the connecting line closer to a quadrangle. This example is effective when the distance between the conductor support pillar 6 and the rotor winding 2 is large due to the structure of the electric rotating machine.

EXAMPLE 5

FIG. 5 shows an example in which the connecting lines 10 of the example shown in FIG. 2 and the example shown in FIG. 3 are combined in shape. That is, the bending portion 10a of the connecting line forms a shape made by integrating the right half of the curve portion of the bending portion 10a of the connecting line shown in the example of FIG. 2, and the left half of the inverted triangle of the bending portion 10a of the connecting line shown in the example in FIG. 3.

In this example, it is possible not only to achieve the same effect as in the above described examples, but also to reduce the own weight as much as possible and to absorb the centrifugal force by the curve portion as a result that the mass of the connecting line 10 is reduced as much as possible and one side of the bending portion 10a of the connecting line forms the curve portion, though the connecting line is bilaterally unsymmetrical in both directions of the rotor axis, and the centrifugal force by rotation is unevenly dispersed to the two routes, and therefore, the operating force by the displacement in the radial direction due to the centrifugal force can be relieved. This example is effective when the connecting line 10 cannot adopt the bilateral symmetrical shape due to the structure of the electric rotating machine.

EXAMPLE 6

FIG. 6 shows an example which forms a shape in which the connecting line 10 of the example shown in FIG. 5 is laterally inverted in the axial direction. That is, the bending portion 10a of the connecting line forms a shape made by integrating the left half of the curve portion of the bending portion 10a of the connecting line shown in the example of FIG. 2, and the right half of the inverted triangle of the bending portion 10a of the connecting line shown in the example of FIG. 3.

In this example, it is possible not only to achieve the same effect as in the above described example, but alto to sufficiently keep electrical insulation since the right side of the bending portion 10a of the connecting line forms the shape of the inverted triangle and thereby the distance 11 between an adjacent rotor winding 2b and the connecting line 10 is secured.

The present invention is not limited to the examples shown in the above drawings, but for example, the stopper 12 can be used in FIGS. 3 to 6.

EXAMPLE 7

Figure 7:
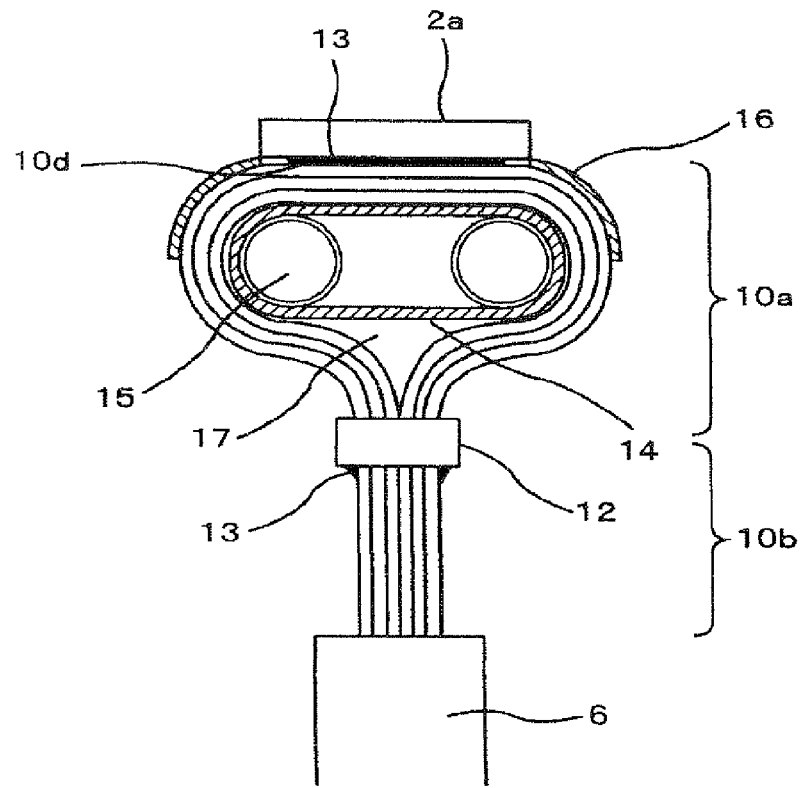
FIG. 7 shows one example of an electric rotating machine manufacturing method of the present invention, and is a view corresponding to a connecting line shown in FIG. 1.

Next, an example of joining the connecting line 10 to the rotor winding 2 at the time of manufacturing the electric rotating machine of the present invention will be shown in FIG. 7.

Usually, a member mainly made of copper is used for the connecting line 10, a brazing material (a metal joining material) 13 is used for joining the connecting line 10 to the rotor winding 2 at the time of manufacturing the electric rotating machine. At the time of the joint, the brazing material 13 is melted with high heat, and therefore, the high heat is conducted to the connecting line 10. However, the copper material is known to change in its material properties and reduce (soften) in strength of the copper material when it is exposed to the high temperature. Accordingly, it is necessary to prevent the heat from being conducted to the connecting line 10 which receives stress repeatedly at each actuation and stoppage of the electric rotating machine, especially to the bending portion 10a of the connecting line, as much as possible at the time of joining it to the rotor winding 2.

In the present invention, the brazing material 13 is provided between the stacked layers of the connecting line 10 which is constructed by stacking a plurality of conductor plates, and between the connecting line 10 and the stopper 12 to join those with each other in advance, and then the connecting line 10 is joined to the conductor support pillar 6. Thereafter, a cooling structure 14 having a cooling water tube 15 is inserted into a hollow part 17 of the connecting line enclosed by the bending portion 10a of the connecting line, the planar brazing material 13 is sandwiched between a connecting portion 2a of the rotor winding and the connecting line 10, and a brazing material flow-inhibitor 16 is coated on the bending portion 10a of the connecting line. After the preparation of theoe, the brazing material 13 is melted by induction heating or the like (not shown) while flowing the cooling water in the cooling water tube 15, and a plane portion of the outermost layer of the conductor plate of the connecting line 10 and the bottom surface of the rotor winding 2 are joined.

According to the method of the present invention for joining the connecting line 10 to the rotor winding 2 as shown above, since the brazing material flow-inhibitor 16 is coated on the bending portion 10a of the connecting line, the high-temperature molten brazing material 13 can be prevented from flowing into the bending portion 10a of the connecting line. Further, by the cooling water flowing in the cooling water tube 15, the heat conduction to the bending portion 10a of the connecting line is absorbed and the temperature rise can be suppressed. As a result, reduction in strength of the copper material of the connecting line 10 can be prevented.

The electric rotating machine having the connecting line according to the present invention can be applied to a generator including a gas turbine or a steam turbine as a drive source, or an electric motor.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of manufacturing an electric rotating machine, including the steps of connecting a rotor winding constituting a part of a rotor and a leader line drawn to an outer diameter side from a conductor provided in a center portion in a radial direction of a rotor body for supplying electricity to the rotor winding from the outside, via a connecting line which is constructed by stacking a plurality of conductor plates and comprises a radial direction linear portion which is straight in the radial direction on the leader line side and a bending portion branching off into two routes toward opposite directions to each other in a rotor shaft direction from the radial direction linear portion and having a linear portion formed in a part of the bending portion, by electrically joining the linear portion of the bending portion and a bottom surface of the rotor winding, the connecting step including:

inserting a cooling structure in a hollow part formed in the bending portion of the connecting line;

subsequently, sandwiching a brazing material between the bottom surface of the rotor winding and the connecting line of the bending portion, and applying a brazing material flow inhibitor on the bending portion of the connecting line; and subsequently, heating the brazing material to melt the brazing material while flowing a cooling medium in the cooling structure, to join an outermost layer of the conductor plates and the bottom surface of the rotor winding.

2. The method of manufacturing the electric rotating machine according to claim 1, wherein the cooling structure comprises a cooling water tube in which cooling water flows.

* * * * *